United States Patent [19]

Yamaguchi et al.

[11] E Re. 29,344

[45] Reissued Aug. 9, 1977

[54] METHOD AND APPARATUS FOR MANUFACTURING TUBES OR TUBULAR BODIES WITH INNER WALLS HAVING CROSS SECTIONS OF IRREGULAR SHAPES

[75] Inventors: Yoshihiro Yamaguchi, Ashiya; Tomiharu Matsushita, Nishinomiya; Masataka Noguchi, Kobe; Junichi Nakagawa, Hatano; Hakumi Hasegawa, Akashi, all of Japan

[73] Assignee: Kobe Steel, Ltd., Kobe, Japan

[21] Appl. No.: 684,234

[22] Filed: May 7, 1976

Related U.S. Patent Documents

Reissue of:

[64] Patent No.: 3,808,860
Issued: May 7, 1974
Appl. No.: 281,041
Filed: Aug. 16, 1972

[30] Foreign Application Priority Data

Aug. 18, 1971 Japan ..... 46-63129

[51] Int. Cl.[2] ..... B21C 25/08; B21C 23/04

[52] U.S. Cl. ..... 72/60; 72/260; 72/264; 72/DIG. 31

[58] Field of Search ..... 72/60, 260, 264, DIG. 31

[56] References Cited

U.S. PATENT DOCUMENTS

| | | | |
|---|---|---|---|
| 3,267,712 | 8/1966 | Atkin | 72/264 |
| 3,580,019 | 5/1971 | Beresnev et al. | 72/47 |
| 3,722,245 | 3/1973 | Yamamoto et al. | 72/60 |
| 3,727,444 | 4/1973 | Nilsson | 72/60 |
| 3,751,958 | 8/1973 | Nilsson et al. | 72/60 |
| 3,807,032 | 4/1974 | Nilsson | 72/60 X |
| 3,946,584 | 3/1976 | Yamasaki et al. | 72/264 |

FOREIGN PATENT DOCUMENTS

| | | | |
|---|---|---|---|
| 337,478 | 5/1959 | Switzerland | 72/264 |

*Primary Examiner*—C.W. Lanham
*Assistant Examiner*—D. M. Gurley
*Attorney, Agent, or Firm*—Oblon, Fisher, Spivak, McClelland & Maier

[57] ABSTRACT

There are disclosed herein a method and an apparatus for manufacturing tubes or tubular bodies by means of hydrostatic extrusion, which tubes or tubular bodies have axially running holes therethrough having cross-sections of irregular shapes. The method and apparatus utilize a mandrel of novel construction which comprises a conical tip portion having a smooth peripheral surface, a cut or grooved intermediate portion with a sloped groove starting at a peripheral edge and a body portion formed with a flange and adapted to move longitudinally of a pressure chamber, as necessary. The conical tip portion is specifically intended to seal against the conical end of a metallic billet. Unless there is such a provision, there would be leakage of a fluid through the grooved portion because of direct contact of the grooved edge with the inner end surface of the billet. Thus, this method and the apparatus for performing the method enables one-step extrusion of tubes or tubular bodies having inner fins or inner walls having irregularly shaped cross-sections, with the accompanying advantages of providing complete sealing among the die, the billet and the mandrel, particularly in the initial stage of the extrusion.

3 Claims, 10 Drawing Figures

FIG.1
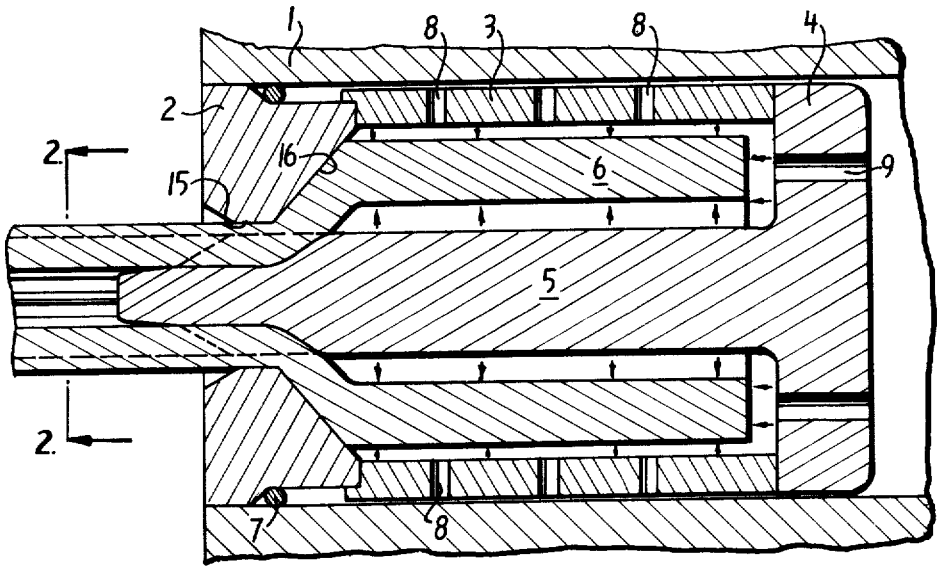
FIG.2
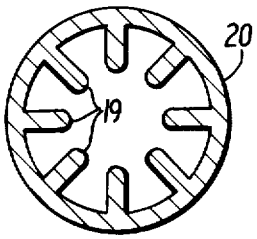
FIG. 3
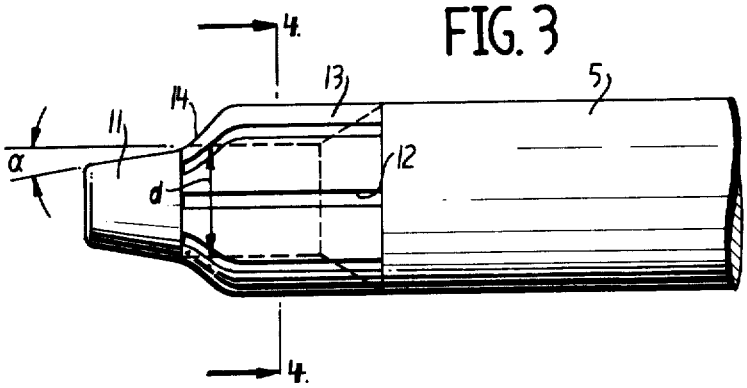
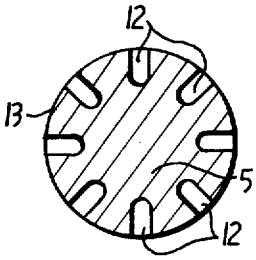
FIG. 4
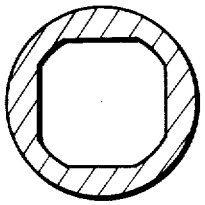
FIG. 5
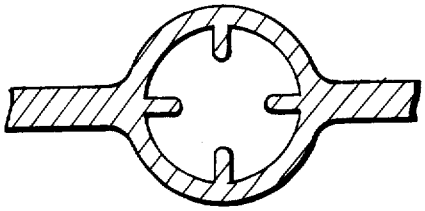
FIG. 6
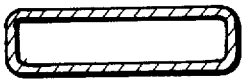
FIG. 7

METHOD AND APPARATUS FOR MANUFACTURING TUBES OR TUBULAR BODIES WITH INNER WALLS HAVING CROSS SECTIONS OF IRREGULAR SHAPES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to the manufacture of tubes or tubular bodies by means of hydrostatic extrusion, and more particularly to a method and apparatus for use in manufacturing tubes or tubular bodies with inner fins or with inner walls having cross-sections of irregular shapes.

2. Description of the Prior Art

Many methods are known for manufacturing tubes or tubular bodies having fins on the inner or outer peripheral surfaces thereof being designed for use, for example, in a heat exchanger or a cooling system. However, it is also known that such methods inevitably include complicated steps, such as, for instance, in the case of manufacturing tubes having inner fins, it would be even impossible to resort to a ram type extrusion method because of the construction of the tubes, unlike the case with the manufacture of tubes having outer fins, whose manufacturing method only necessitates the use of a modified die shape. Furthermore, as to the manufacture of tubes having inner fins, there has heretofore been disclosed only a primitive method wherein a tube portion and a fin portion are separately manufactured and thereafter the two portions are assembled integrally to form tubes having fins on their inner walls. However, in this method, many drawbacks are present, namely that such a method involves many complicated steps, and that there tends to be poor adhesion between the fin portion and the tube portion, with the result that there is poor heat transmission therethrough, such that the device fails to achieve the complete heat exchanging purpose being imposed on such inner fin type tubes.

Thus, as described above, the main reason for the adoption of such a complicated process lies in the inadaptability of a ram type extrusion method to the manufacturing of inner fin type tubes. Therefore, it is intended that a novel aspect of the manufacture of such inner fin type tubes be developed by adopting a hydrostatic extrusion method rather than the conventional complicated methods of ram type extrusion.

SUMMARY OF THE INVENTION

Accordingly, it is a principal object of the present invention to provide a method and apparatus for use in manufacturing tubes or tubular bodies having axially running holes therethrough by means of a hydrostatic extrusion, said holes being formed with the inner walls thereof having irregularly shaped cross-sections either with or without fin portions.

It is another object of the present invention to provide a method and apparatus for use in manufacturing tubes or tubular bodies in a simplified manner, such as, in a one-step extrusion from a stock or billet.

It is a still further object of the present invention to provide a manufacturing method and apparatus for performing the same which insures complete sealing at the start of the extrusion between the die and the billet inner end surface and between the billet inner end surface and the mandrel tip portion.

It has now been found that the foregoing and related objects can be easily attained according to a method and apparatus of the present invention.

In the use of a mandrel having grooved tip portions which in turn form inner fins or an inner irregularly shaped cross-section for such tubes or tubular bodies, the problem which would first be encountered, when the billet is placed in the pressure chamber, is apparently the leakage through the grooved portion of the mandrel when the grooved portion of the mandrel is urged directly against the inner end surface of the billet in the presence of a pressure medium.

According to one aspect of the present invention, there is provided a tip portion of a shape which accommodates complete sealing against the billet end when the mandrel is advanced toward the die to contact the billet inner end surface. In this respect, the tip portion of the mandrel is free of grooves but has a smooth outer peripheral surface. In the subsequent aspect of the extrusion, when the mandrel is further advanced against the billet end, the grooved portion thereof should make an ingress into the inner end surface of the billet, the outer surface of which, at this time, is in contact with the inner wall of the inlet opening of the die. To accommodate this operation, there is provided a sloped starting edge for the grooved portion of the mandrel.

More specifically, the method of the present invention comprises the steps in which a metallic billet is placed in a pressure chamber with a conical inner end of the billet being in contact with a die having an approximately similar conical inlet opening, then a mandrel is inserted in a hole extending axially through the billet placed within the pressure chamber with the conical tip portion of the mandrel sealing against the inner end surface of the billet, and when the mandrel is further advanced, the succeeding grooved portion thereof makes an ingress into the inner end surface of the billet, followed by the extrusion of the billet through the gap between the mandrel and the die to give a tube with an inner wall having an irregular cross-section or fin portions. The hydrostatic pressure used in this connection is applied to the annular space between the mandrel and the billet along the remaining portion thereof. It should be noted that, at the time the grooved portion of the mandrel is caused to make ingress into the billet inner end surface, that is when the mandrel is positioned in the normal extruding position, a flange integral with the mandrel will be so positioned as to close the pressure chamber.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts, and in which:

FIG. 1 is a longitudinal cross-sectional view of one embodiment of an extrusion device constructed according to the present invention, showing a metallic billet being extruded through a die;

FIG. 2 is a cross-sectional view taken along the line 2—2 of FIG. 1;

FIG. 3 is a side elevational view of a mandrel, such as is shown in FIG. 1;

FIG. 4 is a cross-sectional view taken along the line 4—4 of FIG. 3, showing a grooved portion of the mandrel in cross-section;

FIGS. 5, 6 and 7 are tubes having inner walls of various irregularly shaped cross-sections having been formed by the method and apparatus of this invention;

DESCRIPTION OF THE ILLUSTRATED EMBODIMENTS

Figure 8:
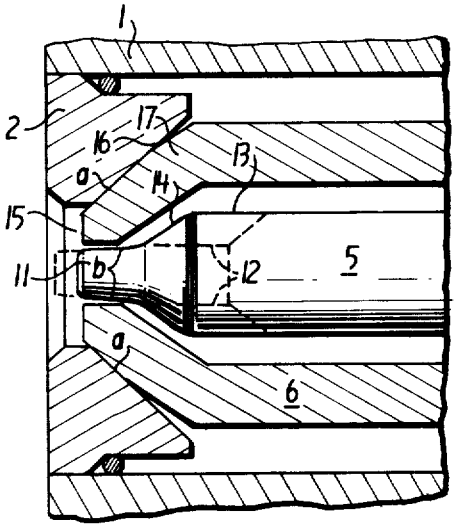
FIG. 8 is a cross-sectional view showing the frustoconical tip of the mandrel of this invention being urged against the inner end surface of the billet.

Referring now to the drawing, and more particularly to FIG. 1, a pressure chamber 1 is shown having a die 2 affixed therein at one end thereof with a seal 7 being shown as an O-ring being located between the die 2 and the pressure chamber 1 to prevent leakage of a pressure medium. A stem, not shown, is slidably mounted through a ram on the other side of the pressure chamber 1 for the purpose of raising the pressure of the pressure medium enclosed therein. A mandrel-holding cylinder 3 is mounted within the pressure chamber 1 with one end thereof being affixed to the die 2, while the other end thereof is adapted to abut a flange 4 of a mandrel. The mandrel-holding cylinder 3, in this respect, is disposed concentrically within the pressure chamber 1, as is a mandrel 5. Through-holes 8 and 9 are provided in the mandrel-holding cylinder 3 and the flange 4 of the mandrel 5, respectively. A hollow billet 6 is the starting material for the inner fin type tubes which are to be formed. It should be noted in this respect that the mandrel 5 has a conical tip portion 11, a cut or grooved portion 12 and a long substantially cylindrical body portion, with the grooved portion being designed to provide inner fin portions for the tubes being extruded, as shown in FIG. 3.

More specifically, the tip portion 11 of the mandrel 5 is formed with a tapered portion having an inclined angle of $\alpha$ with respect to the longitudinal axis thereof, preferably being within the range of 1° to 5°, thus providing complete initial sealing between the billet inner end surface and the tip portion of the mandrel. The maximum diameter of the tapered or conical tip portion 11 of the mandrel 5 is so designed as to be slightly smaller than the diameter of the groove bottom. A sloped portion 14 is provided intermediate the tip portion 11 and a greater diameter portion 13 of the grooved portion 12 in a manner to blend at the opposite ends thereof into both the tip portion 11 and the greater diameter portion 13. The angle of the sloped portion 14 with respect to the center line of a die or mandrel may be determined depending on the inclined angle of the inner wall of the inlet opening or flared portion 16 of the die, as necessary. The number of grooves 12 in the outer periphery of the greater diameter portion may also be determined as necessary although they are shown in FIG. 3, for example, as being eight in number.

It should again be noted that the sloped portion 14 is accommodated to make ingress into the billet inner surface end when the mandrel is further advanced toward the inlet opening of the die and that the sloped portion 14 further aids in providing complete sealing between the billet inner end surface and the outer periphery of mandrel at the initial stage of the extrusion. To this end, however, the inner end surface of the metallic billet should preferably be such as to match with the shape of the sloped portion 14. In FIG. 8, there is shown the initial stage of the extrusion using the mandrel 5 of FIG. 3, in which the inner periphery of the inlet opening of the die 2 is in sealing contact with the outer periphery of the pre-shaped, tapered end surface 17 of the billet 6, as shown at a, while the inner periphery of the pre-shaped end surface 17 of the billet 6 is in sealing contact with the tapered or conical tip portion 11 of the mandrel 5 thereby providing complete sealing therebetween.

Figure 9:
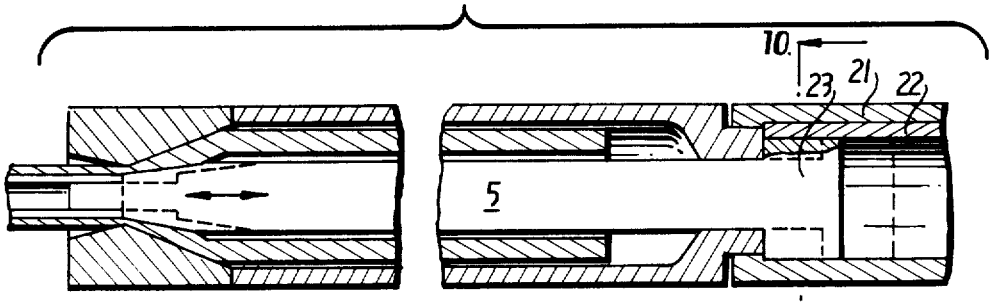
FIG. 9 is a cross-sectional view of a mandrel guiding cylinder which is another embodiment of the present invention.
Figure 10:
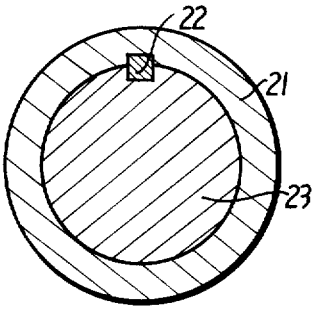
FIG. 10 is a cross-sectional view taken along the line 10—10 of FIG. 9.

Turning now to FIGS. 9 and 10, the rear end 23 of the mandrel 5, as shown, may be mounted within a mandrel guiding cylinder 21 with a key 22 interposed between the mandrel rear end 23 and the guiding cylinder 21 for engagement therebetween, thus preventing rotation of the mandrel 5, while permitting axial movement thereof.

In operation, when a tube having inner fins is to be extruded, a tubular billet 6 having a pre-shaped, tapered tip portion 17 is first placed, together with the pressure medium, within the pressure chamber 1 formed with a mandrel-holding cylinder 3 and a die 2. The mandrel 5 having the aforesaid flange 4 is then inserted into the axially running hole of the tubular billet 6, with the tip portion 11 thereof being positioned concentrically with the extruding outlet opening 15 of the die 2, thus providing sealing relation between the inner surface of billet end 17 and the tip portion 11 of the mandrel and between the outer surface of billet end 17 and the inner wall of the inlet opening of the die 2 due to the pressure build-up of the pressure medium. The mandrel 5 with flange 4 is then further advanced by means of the aforesaid pressure build-up such that the sloped portion 14 of the grooved portion of the mandrel 5 will make an ingress into the billet, while at this time the flange 4 of the mandrel has just closed the pressure chamber 1, and thus the extrusion of the tube having fins or inner walls having irregular cross-sections will be carried out. The pressure medium will exert uniform pressure through the through-holes 8 and 9 to the annular space confined by the outer periphery of the mandrel 5, the inner wall of the flange 4 and the inner wall of the mandrel-holding cylinder 3, as well as to the space outside the outer periphery of the mandrel-holding cylinder 3 and the outer wall of the flange 4. The pressure is applied by means of a ram, not shown, as hereinbefore mentioned. The uniform and high pressure of such pressure medium is shown in FIG. 1 by arrows, in which the pressure medium is shown effecting the extrusion of the tubular billet 6 through the gap between the inner wall of the inlet opening 16 of the die 2 and the tip-and-sloped portions 11 and 14, respectively, of the mandrel 5.

As is apparent, with this arrangement of the invention, there is obtained in the initial stage of the extrusion a complete sealing between the die and the tubular billet and between the billet and the tip-and-sloped portions of the mandrel, thus providing an efficient means for hydrostatically extruding tubes or tubular bodies having inner fins or inner walls of irregularly shaped cross-sections in a one-step extrusion.

Furthermore, in the conventional extrusion methods heretofore known, even if a grooved portion were provided in the mandrel, poor lubrication or great frictional resistance would result at the grooved portion, thus in turn leading to the failure of the mandrel and the use of excessive extruding power. In contrast thereto, the present invention, due to the hydrostatic extrusion, provides good lubrication for extrusion of the billet, thus resulting in lesser extrusion power being required and less chance of failure of the mandrel occurring. This permits an efficient one-step extrusion of the tubes or tubular bodies 20 having inner fins 19 or inner walls of irregularly shaped cross sections, as shown in FIG. 2.

In a test, a tubular aluminum billet was extruded through the extrusion die means shown in FIG. 1. A tube having a wall thickness of 0.7mm, an outer diameter of 16mm and fins of a radial length of 3.75mm was extruded continuously at an extrusion speed of 100 m/min. from the tubular aluminum billet having an outer diameter of 30mm and an inner diameter of 15mm. The extruding pressure required in this example was only 20 percent in excess of that required for extruding a tube having no fins by means of hydrostatic extrusion.

This proved that the method of the present invention can achieve the manufacture of tubes or tubular bodies having an inner fin portion or inner walls of irregularly shaped cross-sections in the same manner as that of the manufacture of conventional tubes in an efficient and easy manner.

In summary, as shown in FIGS. 5, 6 and 7, tubes having inner walls of various shapes of cross-sections may be produced merely by changing the configurations of the mandrel and the die. In addition, where the inner and outer shapes of tubes should be specified with respect to each other, the mandrel such as is shown in FIG. 9 may be used in combination with the mandrel guiding cylinder, such that rotation of the mandrel about its longitudinal axis is prevented.

Still furthermore, where inner spiral fins are required for the inner walls of such tubes, the directions of the grooves of the grooved portion of the mandrel may be inclined to the longitudinal axis of the mandrel.

Although the present invention has been described with respect to specific details of certain embodiments thereof, it is recognized that various modifications and variations are possible in light of the these teachings. It is to be understood therefore that within the scope of the appended claims, the invention may be practiced otherwise than as specifically described herein.

What is claimed as new and desired to be secured by Letters Patent of the United States is:

1. A method of manufacturing tubes or tubular bodies with inner walls having cross-sections of irregular shapes by means of hydrostatic extrusion, comprising the steps of:

placing a tubular billet having a pre-shaped, tapered tip portion against a die in a pressure chamber with a mandrel positioned in an axially extending hole of said billet, said mandrel having a conical tip portion and a grooved portion, said conical tip portion of said mandrel being so shaped as to be similar to a corresponding, conically shaped inlet hole of said [die] *billet;* introducing a pressure medium under pressure into said chamber so as to advance said mandrel toward the inner end surface of said billet, such that the conically shaped tip portion and the grooved portion of the mandrel may provide complete sealing between the inner surface of said billet and the tip portion of said mandrel and between the outer surface of said billet and the inner wall of the inlet opening of said die; and raising the pressure of the pressure medium to a required value thereby effecting the extrusion of said tubes or tubular bodies.

2. A method according to claim 1, wherein the application of pressure to said pressure chamber effects the advancement of said mandrel and the extrusion of said tubes or tubular bodies in a single step.

3. A method according to claim 1, wherein said tubular billet is pre-shaped so that the inner end surface of said billet may be in register with the conical tip portion of said mandrel prior to placing said tubular billet in said pressure chamber.

* * * * *